United States Patent
Miller et al.

(10) Patent No.: US 10,068,477 B2
(45) Date of Patent: Sep. 4, 2018

(54) SYSTEM AND METHOD FOR DETECTING AND COMMUNICATING SLIPPING OF NON-CONNECTED VEHICLES

(71) Applicant: Ford Global Technologies, LLC, Dearborn, MI (US)

(72) Inventors: Kenneth James Miller, Canton, MI (US); Charles James Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 152 days.

(21) Appl. No.: 15/142,989

(22) Filed: Apr. 29, 2016

(65) Prior Publication Data

US 2017/0316691 A1    Nov. 2, 2017

(51) Int. Cl.
| | |
|---|---|
| *G08G 1/16* | (2006.01) |
| *B60W 40/114* | (2012.01) |
| *H04W 4/06* | (2009.01) |

(52) U.S. Cl.
CPC .......... *G08G 1/162* (2013.01); *B60W 40/114* (2013.01); *H04W 4/06* (2013.01);
(Continued)

(58) Field of Classification Search
CPC ........ H04L 67/28; G08G 1/0163; G08G 1/04; G08G 1/162; G01S 13/931; G01S 15/931;
(Continued)

(56) References Cited

U.S. PATENT DOCUMENTS

| | | | |
|---|---|---|---|
| 7,840,331 B2 | 11/2010 | Yoshioka et al. | |
| 8,520,695 B1 | 8/2013 | Rubin et al. | |
| (Continued) | | | |

FOREIGN PATENT DOCUMENTS

| | | |
|---|---|---|
| DE | 10013393 A1 | 1/2002 |
| DE | 102006005021 A1 | 8/2007 |
| (Continued) | | |

OTHER PUBLICATIONS

Search Report dated Oct. 20, 2017, for GB Patent Application No. GB1706815.6 (6 pages).
(Continued)

*Primary Examiner* — Yonel Beaulieu
*Assistant Examiner* — Martin A Weeks
(74) *Attorney, Agent, or Firm* — James P. Muraff; Neal, Gerber & Eisenberg LLP

(57) ABSTRACT

Systems and methods for detecting and communicating slipping of non-connected vehicles are disclosed. An example disclosed vehicle includes a wireless communication module and a vehicle marker. The example wireless communication module is configured to determine whether a second vehicle in the vicinity of the vehicle is wireless communication enabled. The example vehicle marker is configured to, in response to detecting that the second vehicle is slipping, when the second vehicle is not wireless communication enabled, broadcast an alert including a location of the second vehicle. Additionally, the example vehicle marker is configured to, in response to detecting that the second vehicle is slipping, display a visual cue visible behind the vehicle.

16 Claims, 5 Drawing Sheets

(52) U.S. Cl.
CPC ..... *B60W 2520/14* (2013.01); *B60W 2720/10* (2013.01); *B60W 2750/40* (2013.01)

(58) Field of Classification Search
CPC .... B60R 1/00; B60R 2300/80; H04W 76/023; H04W 4/06; B60W 40/114; B60W 2520/14; B60W 2750/40; B60W 2720/10
See application file for complete search history.

(56) References Cited

U.S. PATENT DOCUMENTS

| | | | |
|---|---|---|---|
| 9,002,631 B2 | 4/2015 | Taguchi | |
| 2006/0164221 A1* | 7/2006 | Jensen | B60Q 1/525 340/435 |
| 2013/0293394 A1* | 11/2013 | Rubin | G08G 9/02 340/902 |
| 2014/0012492 A1* | 1/2014 | Bowers | G08G 1/166 701/301 |
| 2015/0287323 A1 | 10/2015 | Wells | |
| 2015/0381751 A1 | 12/2015 | Haran | |
| 2016/0318445 A1* | 11/2016 | Sugimoto | B60Q 9/008 |

FOREIGN PATENT DOCUMENTS

| | | |
|---|---|---|
| EP | 1059201 A2 | 12/2000 |
| JP | 3401026 B2 | 4/2003 |
| JP | 2005178622 A | 7/2005 |
| JP | 2006185136 A | 7/2006 |
| WO | WO 2012125106 A1 | 9/2012 |
| WO | WO 2014148991 A1 | 9/2014 |

OTHER PUBLICATIONS

Lockheed Martin, *Core System Requirements Specification (SyRS)*, U.S. Department of Transportation, Research and Innovative Technology Administration, Apr. 2011 (131 Pages).

\* cited by examiner

US 10,068,477 B2

SYSTEM AND METHOD FOR DETECTING AND COMMUNICATING SLIPPING OF NON-CONNECTED VEHICLES

TECHNICAL FIELD

The present disclosure generally relates to connected vehicles more specifically, systems and methods for detecting and communicating slipping of non-connected vehicles.

BACKGROUND

Newer vehicles are often configured to coordinate their motion through wireless communication technology. Older vehicles often lack such communication technology. As a result, newer vehicles lack a mechanism for effectively coordinating with older vehicles.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments for detecting and communicating slipping of non-connected vehicles are disclosed. An example disclosed vehicle includes a wireless communication module and a vehicle marker. The example wireless communication module is configured to determine whether a second vehicle in the vicinity of the vehicle is wireless communication enabled. The example vehicle marker is configured to, in response to detecting that the second vehicle is slipping, when the second vehicle is not wireless communication enabled, broadcast an alert including a location of the second vehicle. Additionally, the example vehicle marker is configured to, in response to detecting that the second vehicle is slipping, display a visual cue visible behind the vehicle.

An example disclosed method includes determining, via a wireless communication module, whether a second vehicle in the vicinity of a first vehicle is wireless communication enabled. The example method includes, in response to detecting that the second vehicle is slipping, when the second vehicle is not wireless communication enabled, broadcast an alert including a location of the second vehicle. The example method also includes, in response to detecting that the second vehicle is slipping, displaying a visual cue visible behind the first vehicle.

An example tangible computer readable medium comprising instructions that, when executed, cause a first vehicle to determine whether a second vehicle in the vicinity of the first vehicle is wireless communication enabled. Additionally, the example instructions, when executed, cause the first vehicle to, in response to detecting that the second vehicle is slipping, when the second vehicle is not wireless communication enabled, broadcast an alert including a location of the second vehicle. Further, the example instructions, when executed, cause the first vehicle to, in response to detecting that the second vehicle is slipping, display a visual cue visible behind the first vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
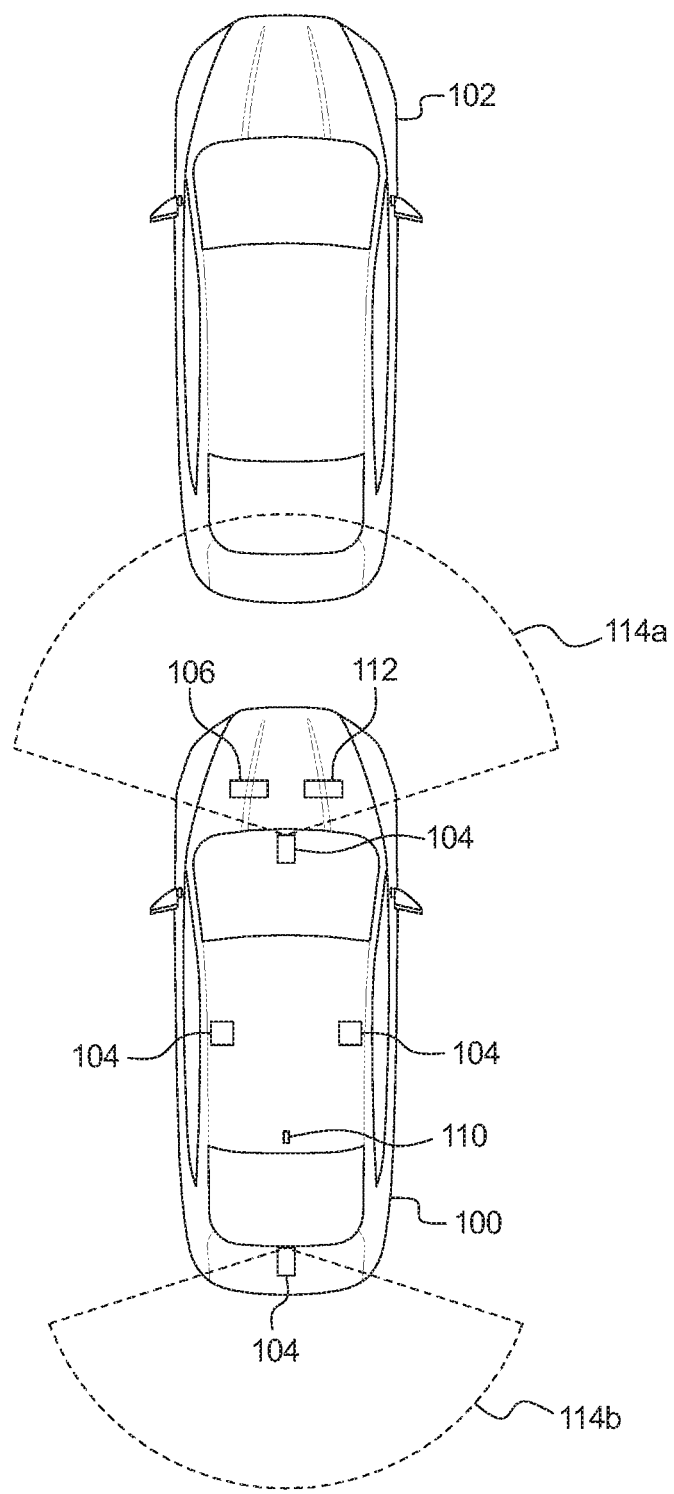
FIGS. 1A and 1B depict a connected vehicle and a non-connected vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicle safety is improving with vehicles communicating and coordinating movement via wireless communication. Older vehicles will remain on the roads even as newer vehicles are produced that are able to communicate with other vehicles. As used herein, vehicles that are equipped with wireless communication technology are referred to as "connected vehicles" and "V2X-enabled vehicles." Additionally, vehicles that are not equipped with wireless communication technology are referred to as "non-connected vehicles" and "standard vehicles."

The wireless communication technology facilitates connected vehicles exchanging information with other connected vehicles. This is sometimes referred to as vehicle-to-vehicle ("V2V") communication. Connected vehicles may also exchange information with wireless nodes coupled to infrastructure (e.g., traffic signals, lampposts, tunnels, bridges, etc.). This is sometimes referred to as vehicle-to-infrastructure ("V2I") communication. Connected vehicles may also exchange information with mobile devices (e.g., phones, smart watches, tablets, etc.) carried by pedestrians. This is sometimes referred to as vehicle-to-pedestrian ("V2P") communication. Together, V2V, V2I and V2P are jointly referred to as "V2X." The wireless communication technology includes any suitable technology that facilitates vehicles exchanging information. In some examples, ad hoc wireless local area networks are used to exchange information. Another example of wireless communication technology is direct short range communication ("DSRC"). DSRC is a wireless communication protocol or system, mainly meant for transportation, operating in a 5.9 GHz spectrum band. Connected vehicles using DSRC establish connections with each other and/or, from time to time, transmit safety messages that include the location of the vehicle, the speed and heading of the vehicle, and/or alerts affecting the performance of the vehicle.

As disclosed in more detail below, the connected vehicles use sensors (e.g., cameras, ultra-sonic sensors, sonar, LiDAR, RADAR, optical sensors, infrared sensors, etc.) to detect other vehicles in the vicinity of the connected vehicle. The connected vehicle (e.g., the detecting vehicle) classifies the detected other vehicles individually as connected vehicles or non-connected vehicles. The connected vehicle also uses the sensors to determine whether one(s) of the detected vehicles has/have lost traction (e.g., are sliding). The detecting vehicle reacts to detecting a vehicle is sliding by slowing down and/or flashing light (e.g., taillights, etc.) in a pattern to warn non-connected vehicles within eyesight. If the detected vehicle is a non-connected vehicle, the detecting vehicle broadcasts a message alerting connected vehicles in range to the location of the sliding vehicle.

Figure 1B:
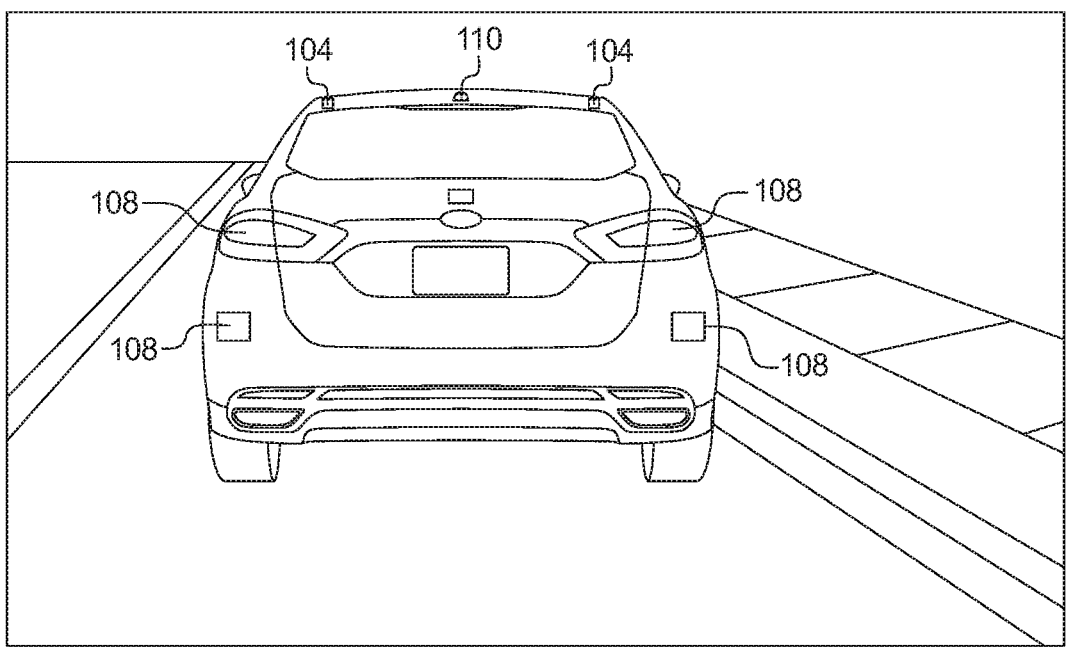

FIGS. 1A and 1B depict a connected vehicle 100 and a non-connected vehicle 102 (e.g., a standard vehicle) operating in accordance with the teachings of this disclosure. The vehicles 100 and 102 may be standard gasoline powered vehicles, hybrid vehicles, electric vehicles, fuel cell vehicles, and/or any other mobility implement type of vehicle. The vehicles 100 and 102 include parts related to mobility, such as a powertrain with an engine, a transmission, a suspension, a driveshaft, and/or wheels, etc. The connected vehicle 100 may be non-autonomous, semi-autonomous, or autonomous.

The vehicles 100 and 102 exhibit vehicle characteristics and driving properties. Characteristics include fixed or constant features of the vehicle, such as its acceleration capacity, braking capacity, V2X capability (explained below), size, and/or weight, etc. Properties refer to variable features of the vehicles 100 and 102, such as position or location, speed, acceleration, decelerating, level of fuel, and/or current activity of its lights or horn, etc. Properties may also include some fixed features of the vehicle, such as its size, length, and width. Drivers of the vehicles 100 and 102 have certain propensities. Propensities include reaction time, aggressiveness, passivity, and/or level of alertness, etc.

In the illustrated examples of FIGS. 1A and 1B, the connected vehicle 100 includes sensors 104, a body control unit 106, lights 108, a DSRC module 110, and a vehicle marker 112. The sensors 104 can be arranged in and around the car in a suitable fashion. The sensors 104 can all be the same or different. There can be many sensors 104, as shown in FIG. 1B, or only a single sensor 104. The sensors 104 may include a camera, ultra-sonic sensors, sonar, LiDAR, RADAR, an optical sensor, or an infrared device configured to measure properties around the exterior of the vehicle, as indicated by the dashed lines 114a and 114b in FIG. 1A. Some sensors 104 may be mounted inside the passenger compartment of the connected vehicle 100, on the outside or exterior of the vehicle, or in the engine compartment of the connected vehicle 100. In some examples, the sensors 104 in the interior of the connected vehicle 100 are used to identify the vehicle's driver via facial recognition, speech recognition, or communication with a device, such as a vehicle key or mobile phone personal to the driver. The sensors 104 may have an OFF state and various ON states.

The body control unit 106 is an electronic control unit (ECU) that controls various subsystems of the connected vehicle 100. For example, the body control unit 106 may control power windows, power locks, an immobilizer system, and/or power mirrors, etc. In the illustrated example of FIG. 1A, the body control unit 106 controls the lights 108.

The body control unit 106 includes circuits to, for example, drive relays (e.g., to control wiper fluid, etc.), drive brushed direct current ("DC") motors (e.g., to control power seats, power locks, power windows, wipers, etc.), drive stepper motors, and/or drive LEDs, etc. The body control unit 106 is communicatively coupled to input controls within the connected vehicle 100, such as power window control buttons, power lock buttons, exterior lighting controls, etc. The body control unit 106 instructs the subsystem to act based on the corresponding to the actuated input control. For example, if the driver's side window button is toggled to lower the driver's side window, the body control unit 106 instructs the actuator controlling the position of the driver's side window to lower the window.

The lights 108 include the exterior lights of the connected vehicle 100, such as head lights, tail lights, turn signals, fog lamps, brake lights, and/or undercarriage lights, etc. The lights 108 include halogen lights, xenon lights, and/or arrays of light emitting diodes (LEDs). The body control unit 106 may control the lights 108 to produce a visual cue for the non-connected vehicles 102 in the vicinity of the connected vehicle 100 when requested by the vehicle marker 112. The visual cue includes one or more of the lights 108, a specific flashing pattern of the light(s) 108, a specific color or combination of the light(s) 108, a shape of the light(s) 108, a specific grid of the light(s) 108 (e.g., when the controlled light is an array of LEDs, etc.), a curve of lights, multiple moving curves of lights, a specific intensity of the light(s) 108.

The example DSRC module 110 include antenna(s), radio(s) and software to broadcast messages and to establish direct connections between connected vehicles 100, infrastructure-based modules (not shown), and mobile device-based modules (not shown). More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The vehicle marker 112 detects vehicles (e.g., the detected vehicles 200a, 200b, 200c, and 200d of FIG. 2 below) in the vicinity of the connected vehicle 100 via the sensors 104. The vehicle marker 112 uses the sensors 104, such as the sonar, the RADAR, the LiDAR, or the camera(s), or any other object detecting sensor, including an optical sensor, to sense or detect objects around the connected vehicle 100. Upon detection, the vehicle marker 112 runs the object through a filtering program or algorithm to determine whether the object is a non-vehicle object (e.g., a tree, a lamppost, an animal, etc.) or another vehicle. When a vehicle is detected, the vehicle marker 112 classifies the vehicle as either a V2X-enabled vehicle or a standard vehicle. To determine whether a detected vehicle is a V2X-enabled vehicle, the vehicle marker 112 (a) determines if the location of the detected vehicle corresponds to a location identified in a safety message received via the DSRC module 110 from a V2X-enabled vehicle in range (e.g., 300 meters, etc.), and/or (b) tries to establish a connection with the detected vehicle via the DSRC module 110. The vehicle marker 112 classifies the detected vehicle as a V2X-enabled vehicle if (i) the location of the detected vehicle corresponds to a location identified in a safety message, or (ii) the vehicle marker 112 successfully established a V2V connection with the detected vehicle. The vehicle marker 112 classifies other detected vehicles (e.g., vehicles not classified as V2X-enabled vehicles) as standard vehicles. In some examples, using the sensors 104, the vehicle marker 112 tracks the location of the detected vehicles that have been classified so as not to reclassify detected vehicles.

Figure 2:
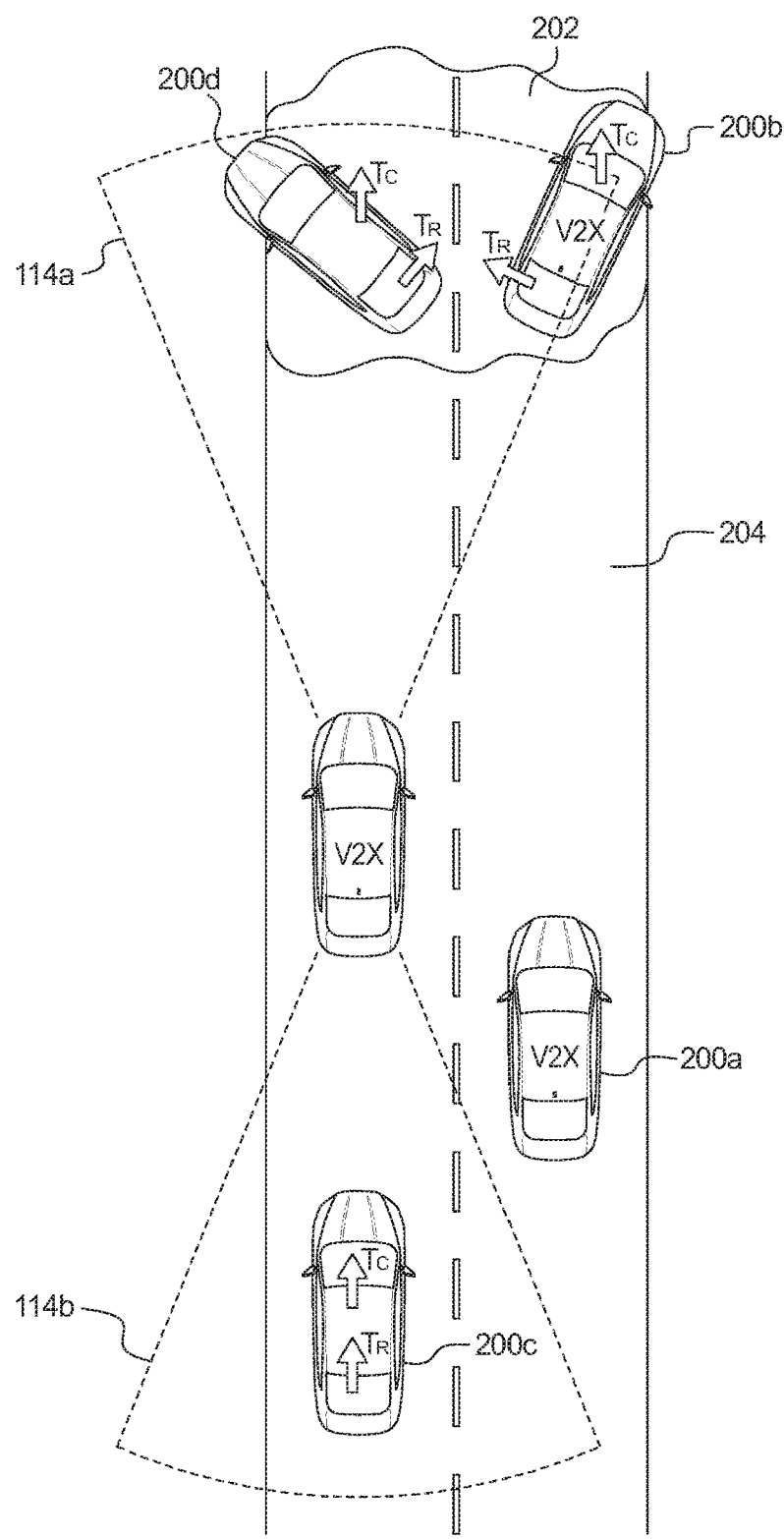
FIG. 2 is a top view of the connected vehicle of FIGS. 1A and 1B detecting and communicating the slipping of the non-connected vehicle of FIG. 1A.

The vehicle marker 112 monitors at least some the vehicle characteristics and the driving properties of the detected vehicles. FIG. 2 illustrates detected vehicles 200a, 200b, 200c, and 200d in the vicinity of the connected vehicle 100. In the illustrated example, some of the detected vehicles 200a and 200b are V2X-enabled vehicles and some of the detected vehicle 200c and 200d are standard vehicles. The vehicle marker 112 of the connected vehicle 100 monitors the vehicle characteristics and the driving properties of the V2X-enabled vehicles 200a and 200b via the safety messages received by the DSRC module 110. The vehicle marker 112 monitors the vehicle characteristics and the driving properties of the standard vehicles 200c and 200d with the sensors 104.

Based on the vehicle characteristics and the driving properties of the detected vehicles 200a, 200b, 200c, and 200d, the vehicle marker 112 identifies when one or more of the detected vehicles 200a, 200b, 200c, and 200d are slipping on a portion 202 of a road 204 ahead of the connected vehicle 100. A vehicle is slipping when two or more of the wheels (e.g., the rear wheels, etc.) of the vehicle lose traction with the road 204. For examples, a vehicle may slip when the portion 202 of the road 204 has low friction due to sand, gravel, oil, rain, snow, and/or ice, etc, the vehicle hydroplaning due to standing water, or the vehicle executing a turn at a high speed, etc. To identify when one of the V2X vehicles 200a and 200b is slipping, the vehicle marker 112 monitors the safety messages transmitted by the V2X vehicles 200a and 200b. When the one of the V2X vehicles 200a and 200b is slipping or taking corrective action to prevent slipping (e.g., activating traction control, engaging the anti-lock brakes, activating stability control, etc), the safety messages broadcast from that V2X vehicle 200a and 200b includes an indication of the slipping of the corrective action.

To identify that one of the standard vehicles 200b and 200c is slipping, the vehicle marker 112 identifies patterns in the vehicle characteristics and the driving properties of the standard vehicles 200b and 200c that indicate that the one of the standard vehicles 200b and 200c is slipping. In some examples, the vehicle marker 112 tracks the rear of the standard vehicle 200d in front of the connected vehicle 100 with the sensors. In such examples, the vehicle marker 112 uses a filtering program or algorithm to determine where the rear of the standard vehicle 200d is relative to the curvature of the road 204. For example, if the road 204 is straight, but the rear of the standard vehicle 200d is not straight ahead, the vehicle marker 112 may determine that the standard vehicle 200d is slipping, after compensating for normal front wheel steering where the driver decides to exit the lane. Alternatively or additionally, in some examples, the vehicle marker 112 may (i) track the movement of the rear wheels of the standard vehicle 200d, (ii) track changes in the velocity direction of the standard vehicle 200d, and/or (iii) track the rotation of the vehicle.

In some examples the vehicle marker 112, via the sensors 104 determine slipping by determining that the rotation of the detected vehicle 200d for its present forward velocity direction, does not match the expected rotation. In such examples, the vehicle marker 112 tracks a center trajectory (TO and a rear trajectory ($T_R$) for the detected vehicles 200a, 200b, 200c, and 200d. For example, if the center trajectory ($T_C$) of the detected vehicle 200d is straight then the rear trajectory ($T_R$) of the detected vehicle 200d is expected to follow that straight trajectory, Additionally, in such examples, if the direction of the detected vehicle 200d is indicative of changing lanes, then the rear of the detected vehicle 200d should follow that lane changing trajectory. For example, when the detected vehicle 200d is intending to go straight, the rear may slide to one side, so that the velocity direction or trajectory ($T_R$) of the rear of the detected vehicle 200d does not match the trajectory of the center of the detected vehicle 200d, causing the back of the vehicle to move laterally faster and/or further than the center of the detected vehicle 200d. In such an example, the vehicle marker 112 determines that the detected vehicle 200d is rotating and thus slipping. As another example, the center direction detected vehicle 200d may be indicative of a vehicle changing lanes or turning. In such an example, if the velocity direction of the rear of the detected vehicle 200d is more or less lateral than the center velocity direction of the detected vehicle 200d, then vehicle marker 112 determines that the detected vehicle 200d is slipping. The center velocity and rear velocity is determined by the sensors 104. For example, the object recognition determines the rectangular shape of the vehicle and then is able to detect the unexpected rotation of the vehicle's rectangular shape.

When one or more of the detected vehicles 200b and 200d are slipping, the vehicle marker 112 reacts. When the detected vehicle 200d that is slipping is a standard vehicle, the vehicle marker 112, via the DSRC module 110, broadcasts a safety message with the location of the detected vehicle 200d. In some examples, the safety message also includes one or more of the vehicle characteristics and the driving properties of the detected vehicle 200d. Additionally, when the detected vehicle 200b and 200d that is slipping is a standard vehicle or a V2X vehicle, vehicle marker 112 instructs the body control module display the visual cue. In some examples, when the connected vehicle is autonomous or semi-autonomous, the vehicle marker 112 instructs other ECUs, such as an engine control unit and/or an adaptive cruise control, to gradually slow the connected vehicle 100 down before the connected vehicle 100 reached the slippery portion 202 of the road 204.

Figure 3:
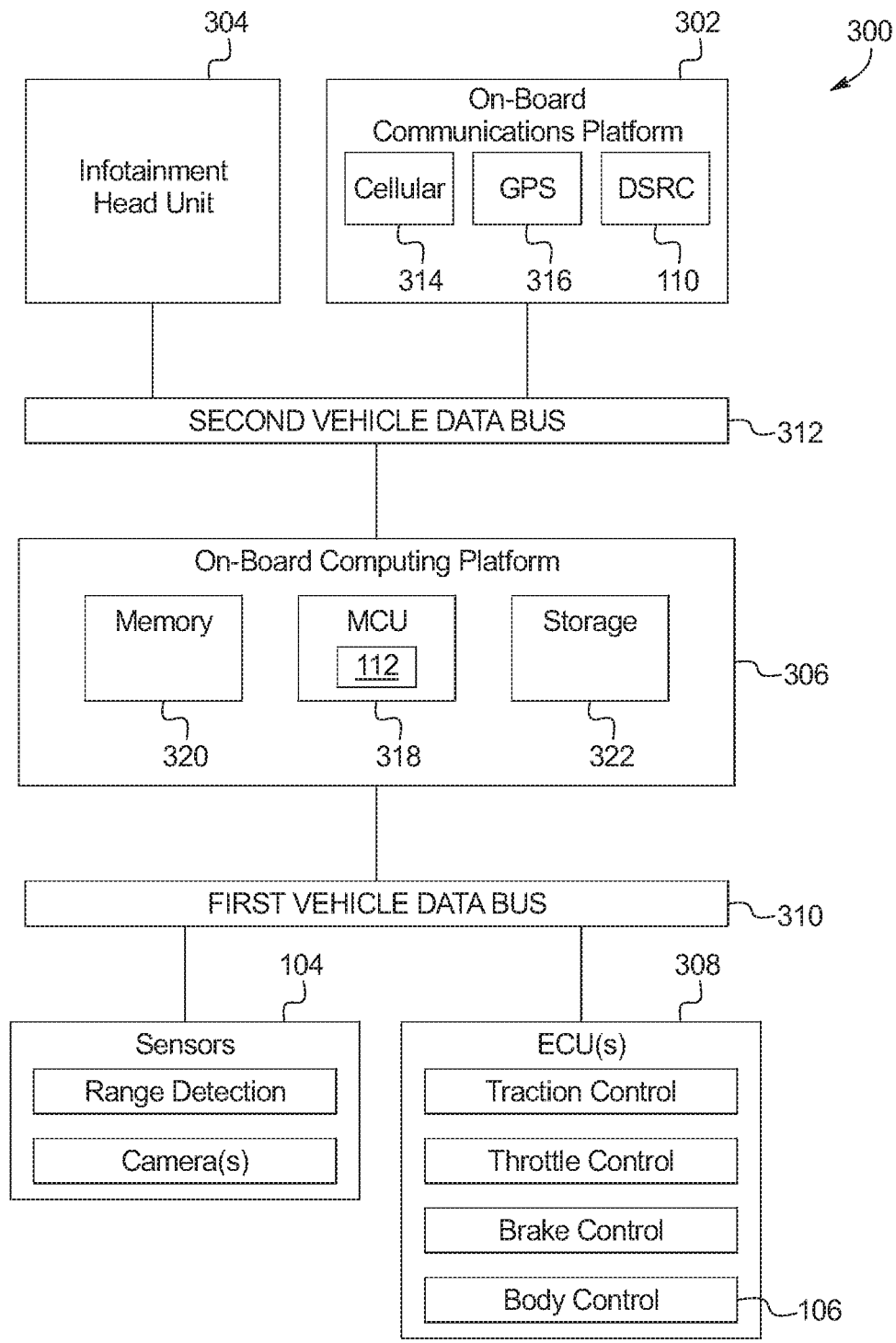
FIG. 3 is a block diagram illustrating electronic components of the connected vehicle of FIGS. 1A, 1B, and 2.

FIG. 3 is a block diagram of electronic components 300 of the connected vehicle 100 of FIGS. 1A, 1B and 2. The electronic components 300 include an example on-board communications platform 302, the example infotainment head unit 304, an on-board computing platform 306, the example sensors 104, example electronic control units (ECUs) 308, a first vehicle data bus 310, and second vehicle data bus 312.

The on-board communications platform 302 includes wired or wireless network interfaces to enable communication with external networks. The on-board communications platform 302 also includes hardware (e.g., processors, memory, storage, antenna, etc.) and software to control the wired or wireless network interfaces. In the illustrated example, the on-board communications platform 302 includes a cellular modem 314, a GPS receiver 316, and the DSRC module 110. The cellular modem 314 includes controllers for standards-based networks (e.g., Global System for Mobile Communications ("GSM"), Universal Mobile Telecommunications System ("UMTS"), Long Term Evolution ("LTE"), Code Division Multiple Access ("CDMA"), WiMAX ("IEEE 802.16m"); and Wireless Gigabit ("IEEE 802.11ad"), etc. The on-board communications platform 302 may also include one or more controllers for wireless local area networks such as a Wi-FI® controller (including IEEE 802.11 a/b/g/n/ac or others), a Bluetooth® controller (based on the Bluetooth® Core Specification maintained by the Bluetooth Special Interest Group), and/or a ZigBee® controller ("IEEE 802.15.4"), and/or a Near Field Communication ("NFC") controller, etc. Further, the external network(s) may be a public network, such as the Internet; a private network, such as an intranet; or combinations thereof, and may utilize a variety of networking protocols now available or later developed including, but not limited to, TCP/IP-based networking protocols. The on-board communications platform 302 may also include a wired or wireless interface to enable direct communication with an electronic device (e.g., a smart phone, a tablet computer, a laptop, etc.).

The infotainment head unit 304 provides an interface between the connected vehicle 100 and users (e.g., drivers, passengers, etc.). The infotainment head unit 304 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a dashboard panel, a heads-up display, a center console display (e.g., a liquid crystal display ("LCD"), an organic light emitting diode ("OLED") display, a flat panel display, a solid state display, or a heads-up display), and/or speakers. When the vehicle marker 112 determines that one of the detected vehicles 200a, 200b, 200c, and 220d is slipping, the vehicle marker 112, via the infotainment head unit 304, may display a recommendation to slow down and/or a notification (e.g., on the center console display, on the dashboard panel, etc.). Additionally, the vehicle marker 112, via the infotainment head unit 304, may provide an audible cue to the user(s).

The on-board computing platform 306 includes a processor or controller 318, memory 320, and storage 322. In the illustrated example, the on-board computing platform 306 is structured to include the vehicle marker 112. Alternatively, in some examples, the vehicle marker 112 may be incorporated into an ECU 308 with its own processor and memory. The processor or controller 318 may be any suitable processing device or set of processing devices such as, but not limited to: a microprocessor, a microcontroller-based platform, a suitable integrated circuit, one or more field programmable gate arrays ("FPGAs"), and/or one or more application-specific integrated circuits ("ASICs"). The memory 320 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 320 includes multiple kinds of memory, particularly volatile memory and non-volatile memory. The storage 322 may include any high-capacity storage device, such as a hard drive, and/or a solid state drive.

The memory 320 and the storage 322 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 320, the computer readable medium, and/or within the processor 318 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The ECUs 308 monitor and control the systems of the connected vehicle 100. The ECUs 308 communicate and exchange information via the first vehicle data bus 310. Additionally, the ECUs 308 may communicate properties (such as, status of the ECU 308, sensor readings, control state, error and diagnostic codes, etc.) to and/or receive requests from other ECUs 308. Some vehicles 100 may have seventy or more ECUs 308 located in various locations around the vehicle 100 communicatively coupled by the first vehicle data bus 310. The ECUs 308 are discrete sets of electronics that include their own circuit(s) (such as integrated circuits, microprocessors, memory, storage, etc.) and firmware, sensors, actuators, and/or mounting hardware. In the illustrated example, the ECUs 308 include the traction control, a throttle control, a brake control, and the body control unit 106. When the connected vehicle is autonomous or semi-autonomous, the ECUs 308 may also include an adaptive cruise control.

The first vehicle data bus 310 communicatively couples the sensors 104, the ECUs 308, the on-board computing platform 306, and other devices connected to the first vehicle data bus 310. In some examples, the first vehicle data bus 310 is implemented in accordance with the controller area network ("CAN") bus protocol as defined by International Standards Organization (ISO) 11898-1. Alternatively, in some examples, the first vehicle data bus 310 may be a different bus protocol, such as a Media Oriented Systems Transport ("MOST") bus, or a CAN flexible data ("CAN-FD") bus (defined by ISO 11898-7). The second vehicle data bus 312 communicatively couples the on-board communications platform 302, the infotainment head unit 304, and the on-board computing platform 306. The second vehicle data bus 312 may be a MOST bus, a CAN-FD bus, or an Ethernet bus. In some examples, the on-board computing platform 306 communicatively isolates the first vehicle data bus 310 and the second vehicle data bus 312 (e.g., via firewalls, message brokers, etc.). Alternatively, in some examples, the first vehicle data bus 310 and the second vehicle data bus 312 are the same data bus.

Figure 4:
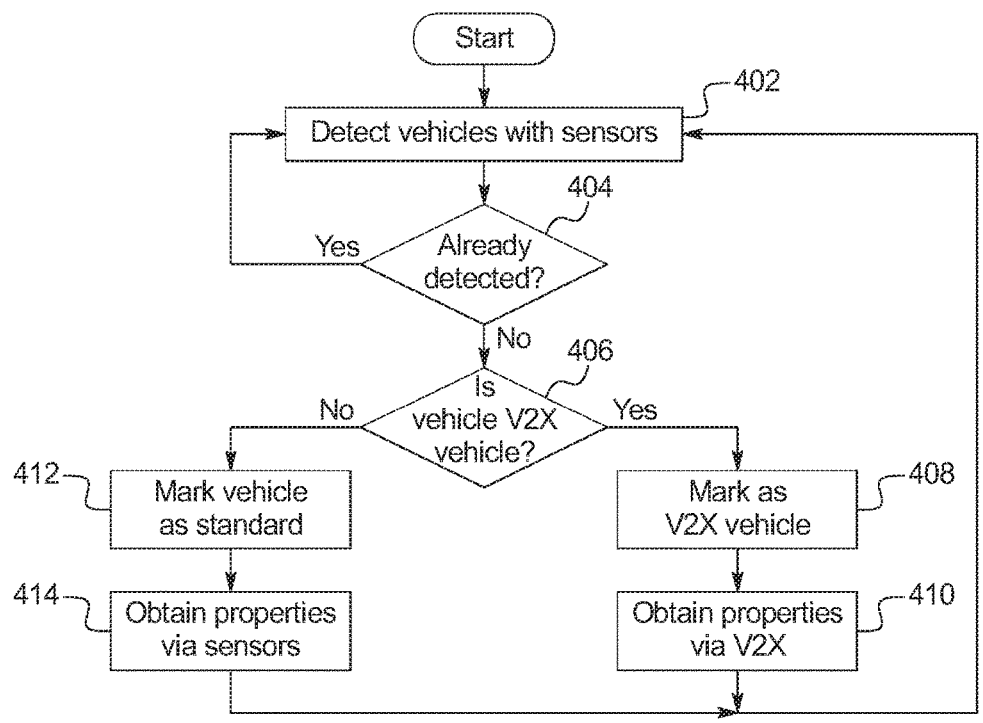
FIG. 4 is a flowchart of an example method of detecting whether a vehicle is a connected vehicle or a non-connected vehicle that may be implemented by the electronic components of FIG. 3.

FIG. 4 is a flowchart of an example method of detecting whether a vehicle (e.g., one of the detected vehicles 200a, 200b, 200c, and 200d of FIG. 2) is a connected vehicle or a non-connected vehicle that may be implemented by the electronic components 300 of FIG. 3. Initially, the vehicle marker 112 detects a vehicle with the sensors 104 (block 402). The sensors 104 use sonar, RADAR, LiDAR, or a camera, or any other object detecting sensor, including an optical sensor, to sense or detect objects in the vicinity of the connected vehicle 100. Upon detection, the vehicle marker 112 runs the object through a filtering program or algorithm to determine whether the object is a non-vehicle object (e.g., a pedestrian, an animal, a fixed object, etc.) or a vehicle. The vehicle marker 112 determines whether the vehicle detected at block 402 has already been detected (block 404).

If the vehicle has not already been detected, the vehicle marker 112 determines whether the vehicle detected at block 402 is an V2X-enabled vehicle 200a and 200b (block 406). To determine whether a detected vehicle is a V2X-enabled vehicle, the vehicle marker 112 (a) determines if the location of the vehicle corresponds to a location identified in a safety message received via the DSRC module 110 from a V2X-enabled vehicle in range (e.g., 300 meters, etc.), and/or (b) tries to establish a connection with the detected vehicle via the DSRC module 110. The vehicle marker 112 classifies the detected vehicle as a V2X-enabled vehicle if (i) the location of the vehicle corresponds to a location identified in a safety message, or (ii) the vehicle marker 112 successfully established a V2V connection with the detected vehicle.

If the vehicle is classified as a V2X-enabled vehicle 200a and 200b, the vehicle marker 112 marks (e.g., in a table in the memory 320 and/or the storage 322 of FIG. 3) that the detected object is a V2X-enabled vehicle 200a and 200b (block 408). In some examples, the vehicle marker 112 associates the V2X-enabled vehicle 200a and 200b with an identifier included with the safety message(s) from the V2X-enabled vehicle 200a and 200b. The vehicle marker 112 obtains the vehicle characteristics and driving properties from the V2X-enabled vehicle 200a and 200b via the DSRC module 110 (block 410). Otherwise, if the vehicle is classified as a standard vehicle 200c and 200d, the vehicle marker 112 marks (e.g., in a table in the memory 320 and/or the storage 322) that the detected object is a standard vehicle 200c and 200d (block 412). In some examples, the vehicle marker 112 assigned the standard vehicle 200c and 200d an identifier to use when tracking the standard vehicle 200c and 200d. The vehicle marker 112 obtains the vehicle characteristics and driving properties (e.g., position, size, speed, acceleration or deceleration, etc.) of the standard vehicle 200c and 200d via the sensors (block 414).

Figure 5:
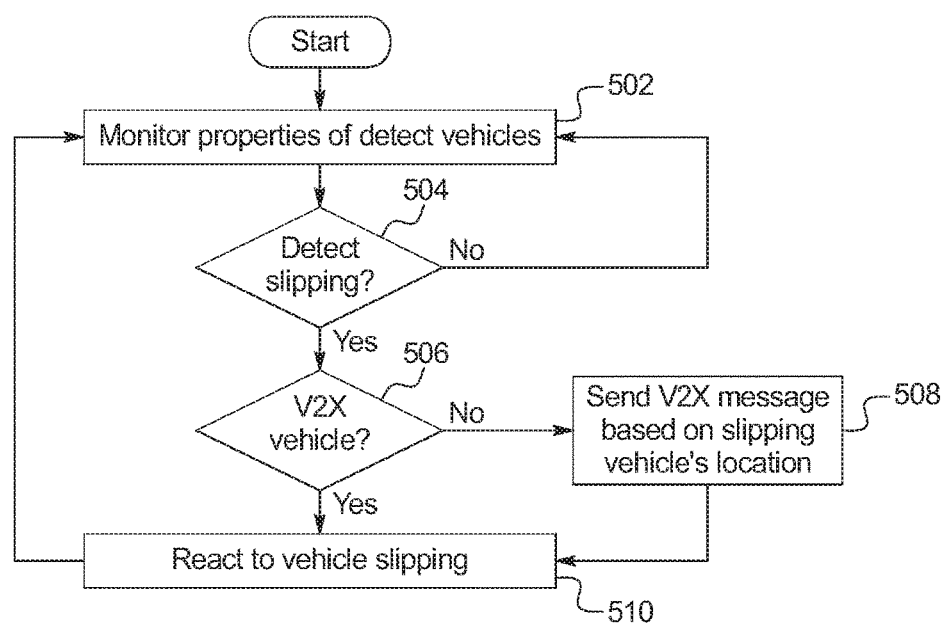
FIG. 5 is a flowchart of an example method of reacting to a slipping non-connected vehicle that may be implemented by the electronic components of FIG. 3.

FIG. 5 is a flowchart of an example method of reacting to a slipping non-connected vehicle (e.g., the detected vehicle 200d of FIG. 2) that may be implemented by the electronic components 300 of FIG. 3. Initially, the vehicle marker 112 monitors the vehicle characteristics and driving properties of the detected vehicles 200a, 200b, 200c, and 200d (block 502). For the detected vehicles 200a and 200b that are mark V2X-enabled, the vehicle marker 112 obtains the vehicle characteristics and driving properties from safety messages broadcast by those detected vehicles 200a and 200b. For the detected vehicles 200c and 200d that are marked as standard, the vehicle marker 112 uses the sensors 104 to measure the vehicle characteristics and driving properties of those detected vehicles 200c and 200d.

The vehicle marker 112 detects whether one or more of the detected vehicles 200a, 200b, 200c, and 200d are slipping on the road 204. (block 504). To determine whether one of the detected vehicles 200a and 200b that is marked as V2X-enabled is slipping, the vehicle marker 112 monitors the safety messages broadcast from those detected vehicles 200a and 200b for indications and/or alerts that the corresponding vehicle is slipping. To determine whether one of the detected vehicles 200c and 200s that is marked as standard is slipping, the vehicle marker 112 analyzes the position, orientation (e.g., relative the direction of the road 204), speed and/or acceleration of the corresponding detected vehicles 200c and 200s. If the vehicle marker 112 detects that at least one of detected vehicles 200a, 200b, 200c, and 200d is slipping, the vehicle marker 112 determines whether the slipping vehicle is a V2X-enabled vehicle or a standard vehicle (block 506). If the slipping vehicle is a standard vehicle, the vehicle marker 112, via the DSRC module 110, broadcasts a message indicating the at least some of the vehicle characteristics and driving properties (e.g., the location, the speed, etc.) and an indication and/or alert that the vehicle is slipping (block 508).

The vehicle marker 112 reacts to the slipping vehicle (block 510). To react to the slipping vehicle, the vehicle marker 112 instructs the body control unit 106 to display a visual cue via the lights 108. In some examples, the vehicle marker 112 displays a recommendation (e.g., via the center console of the infotainment head unit 304) and/or plays the recommendation (e.g. via the sound system of the infotainment head unit 304) for the user of the connected vehicle 100 to slow down. Further, in some examples, when connected vehicle 100 is autonomous or semi-autonomous, the vehicle marker 1112 instructs one or more ECUs 308 (e.g., an engine control unit, an adaptive cruise control, an auto-braking system, etc.) to slow the connected vehicle 100. In such a manner, the connected vehicle 100 informs other vehicles in the vicinity of the potential slipping hazard.

The flowcharts of FIGS. 4 and 5 are methods that may be implemented by machine readable instructions that comprise one or more programs that, when executed by a processor (such as the processor 318 of FIG. 3), cause the connected vehicle 100 to implement the vehicle marker 112 of FIGS. 1A, 2, and 3. Further, although the example program(s) is/are described with reference to the flowcharts illustrated in FIGS. 4 and 5, many other methods of implementing the example vehicle marker 112 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A connected vehicle comprising:
   sensors;
   a wireless communication module configured to determine whether a second vehicle is wireless communication enabled; and
   a vehicle marker configured to:
   detect that the second vehicle is slipping using the sensors; and
   when the second vehicle is not wireless communication enabled:
   broadcast an alert including a location of the second vehicle; and
   display a visual cue to a third vehicle trailing the connected vehicle.

2. The connected vehicle of claim 1, wherein the vehicle marker is configured to compare the location of the second vehicle to locations that are identified in messages received by the wireless communication module to determine whether the second vehicle is wireless communication enabled.

3. The connected vehicle of claim 2, wherein, when the second vehicle is wireless communication enabled, the vehicle marker is configured to detect that the second vehicle is slipping based on messages received by the wireless communication module.

4. The connected vehicle of claim 3, wherein driving properties include a first trajectory of a center of the second vehicle and a second trajectory of a rear of the second vehicle, and wherein the vehicle marker is configured to detect that the second vehicle is slipping when the first trajectory does not match the second trajectory.

5. The connected vehicle of claim 3, wherein driving properties include an expected rotation of the second vehicle based on a present average forward velocity direction, and wherein the vehicle marker is configured to detect that the second vehicle is slipping when an actual rotation of the second vehicle does not match the expected rotation of the second vehicle.

6. The connected vehicle of claim 1, wherein the connected vehicle includes a body control unit, and wherein to display the visual cue, the vehicle marker instructs the body control unit to flash lights of the connected vehicle in a pattern.

7. The connected vehicle of claim 1, wherein the vehicle marker is configured to, in response to detecting that the second vehicle is slipping, instructs a brake control unit of the vehicle to slow the connected vehicle.

8. The connected vehicle of claim 1, wherein the vehicle marker is configured to, in response to detecting that the second vehicle is slipping, instructs an infotainment head unit to display a warning.

9. A method comprising:
   determining, via a wireless communication module of a first vehicle, whether a second vehicle is wireless communication enabled; and
   detecting, via sensors of the first vehicle, that the second vehicle is slipping; and
   when the second vehicle is not wireless communication enabled:
   broadcasting, via the wireless communication module of the first vehicle, an alert including a location of the second vehicle; and
   displaying, via lights of the first vehicle, a visual cue to a third vehicle trailing the first vehicle.

10. The method of claim 9, wherein determining whether the second vehicle is wireless communication enabled includes comparing the location of the second vehicle obtained by the sensors of the first vehicle to locations that are identified in messages received by the wireless communication module.

11. The method of claim 10, including, when the second vehicle is wireless communication enabled, detecting that the second vehicle is slipping based on messages received by the wireless communication module.

12. The method of claim 11, wherein driving properties include a first trajectory of a center of the second vehicle and a second trajectory of a rear of the second vehicle, and wherein detecting that the second vehicle is slipping includes detecting when the first trajectory does not match the second trajectory.

13. The method of claim 11, wherein driving properties include an expected rotation of the second vehicle based on a present average forward velocity direction, and wherein detecting that the second vehicle is slipping includes detecting when an actual rotation of the second vehicle does not match the expected rotation of the second vehicle.

14. The method of claim 9, wherein the visual cue includes flashing the lights of the first vehicle in a pattern.

15. The method of claim 9, including, in response to detecting that the second vehicle is slipping, displaying a warning on an infotainment head unit of the first vehicle.

16. A non-transitory computer readable medium storing instructions that, when executed by at least one processor, cause a first vehicle to:
   determine whether a second vehicle is wireless communication enabled;
   detect that the second vehicle is slipping using sensors; and
   when the second vehicle is not wireless communication enabled:
   broadcast an alert including a location of the second vehicle; and
   display a visual cue to a third vehicle trailing the first vehicle.

* * * * *